United States Patent
Yang et al.

(10) Patent No.: US 10,984,506 B2
(45) Date of Patent: Apr. 20, 2021

(54) IMAGE ANTI-ALIASING METHOD AND IMAGE ANTI-ALIASING DEVICE

(71) Applicant: Shanghai Zhaoxin Semiconductor Co., Ltd., Shanghai (CN)

(72) Inventors: Feifei Yang, Beijing (CN); Weiman Kong, Beijing (CN)

(73) Assignee: GLENFLY TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/779,877

(22) Filed: Feb. 3, 2020

(65) Prior Publication Data
US 2021/0012464 A1    Jan. 14, 2021

(30) Foreign Application Priority Data
Jul. 9, 2019    (CN) .......................... 201910615175.6

(51) Int. Cl.
*G06T 5/00*    (2006.01)
*G06T 5/20*    (2006.01)
*G06T 15/50*    (2011.01)

(52) U.S. Cl.
CPC .............. *G06T 5/002* (2013.01); *G06T 5/20* (2013.01); *G06T 15/503* (2013.01)

(58) Field of Classification Search
None
See application file for complete search history.

(56) References Cited

U.S. PATENT DOCUMENTS

| | | | | |
|---|---|---|---|---|
| 6,088,039 A | * | 7/2000 | Broder | H03M 7/46 345/596 |
| 7,010,163 B1 | * | 3/2006 | Weiss | G06T 5/20 382/168 |
| 8,983,183 B2 | * | 3/2015 | Lalonde | G06T 5/20 382/164 |
| 2009/0154825 A1 | * | 6/2009 | Yang | G06T 5/50 382/260 |

(Continued)

OTHER PUBLICATIONS

Wyman, Chris, and Morgan McGuire. "Improved Alpha Testing Using Hashed Sampling." IEEE transactions on visualization and computer graphics 25.2 (2017): 1309-1320.*

(Continued)

*Primary Examiner* — Ryan M Gray
(74) *Attorney, Agent, or Firm* — McClure, Qualey & Rodack, LLP (57) ABSTRACT

An image anti-aliasing method comprises following steps: receiving an aliasing image; wherein the aliasing image includes a plurality of source pixels; generating a plurality of hash values corresponding to the plurality of source pixels respectively; and performing a filtering processing or a filter generating procedure on the aliasing image according to the plurality of hash values. Each of the plurality of hash values is generated by the following steps: selecting one source pixel from the aliasing image and selecting a window containing the selected source pixel; determining an aliasing strength according to the grayscale values of all the source pixels of a row and a column at which the selected source pixel is located in the window; and determining a hash value of the selected source pixel according to the aliasing strength.

20 Claims, 9 Drawing Sheets

(56) References Cited

U.S. PATENT DOCUMENTS

| | | | |
|---|---|---|---|
| 2010/0215282 A1* | 8/2010 | Van Beek | G06T 5/50 |
| | | | 382/255 |
| 2016/0117805 A1* | 4/2016 | Hsieh | G06T 7/90 |
| | | | 382/275 |
| 2017/0024852 A1* | 1/2017 | Oztireli | G06T 5/50 |
| 2018/0025474 A1* | 1/2018 | Mei | G06T 5/002 |
| | | | 382/275 |
| 2019/0027112 A1* | 1/2019 | Hsu | G06T 11/00 |

OTHER PUBLICATIONS

Lefebvre, Sylvain, Samuel Hornus, and Anass Lasram. "HA-Buffer: Coherent Hashing for single-pass A-buffer." (2013).*

* cited by examiner

IMAGE ANTI-ALIASING METHOD AND IMAGE ANTI-ALIASING DEVICE

CROSS REFERENCE TO RELATED APPLICATIONS

This Application claims priority of China Patent Application No. 201910615175.6, filed on Jul. 9, 2019, the entirety of which is incorporated by reference herein.

BACKGROUND OF THE INVENTION

Field of the Invention

The present disclosure relates to an image processing method and an image processing device and, in particular, to an image anti-aliasing method and an image anti-aliasing device.

Description of the Related Art

In general, all the visual elements in a computer are made up of pixels. Once the resolution of the graphics itself is not high, the pixels will be enlarged when the graphic size is enlarged, and/or when the resolution of the computer screen is not high, these factors will impact that the edge of the font or graphic is visually distorted and looks quite unsightly on the screen.

Anti-aliasing is a method to improve the quality of computer display. This method is a reinforcement measure for the inherent deficiency when the computer displays graphics. The purpose of the anti-aliasing method is to reduce or eliminate the aliasing of computer graphics.

How to convert the aliasing image to an anti-aliasing image has become one of the problems to be solved in the field of art.

BRIEF SUMMARY OF THE INVENTION

In accordance with one feature of the present invention, the present disclosure provides an image anti-aliasing method. The image anti-aliasing method comprises following steps: receiving an aliasing image, wherein the aliasing image includes a plurality of source pixels; generating a plurality of hash values corresponding to the plurality of source pixels respectively; and performing a filtering processing or a filter generating procedure on the aliasing image according to the plurality of hash values. Each of the plurality of hash values is generated by the following steps: selecting one source pixel from the aliasing image and selecting a window containing the selected source pixel; determining an aliasing strength according to the grayscale values of all the source pixels of a row and a column at which the selected source pixel is located in the window; and determining a hash value of the selected source pixel according to the aliasing strength.

In accordance with one feature of the present invention, the present disclosure provides an image anti-aliasing device. The image anti-aliasing device comprises a storage device and a processing device. The processing device is coupled to the storage device. The processing device receives an aliasing image, generates a plurality of hash values corresponding to a plurality of source pixels respectively, and performs a filtering processing or a filter generating procedure on the aliasing image according to the plurality of hash values, wherein the aliasing image includes the plurality of source pixels. Each of the plurality of hash values is generated by the following steps: selecting one source pixel from the aliasing image and selecting a window containing the selected source pixel; determining an aliasing strength according to the grayscale values of all the source pixels of a row and a column at which the selected source pixel is located in the window; and determining a hash value of the selected source pixel according to the aliasing strength.

In summary, the image anti-aliasing method and the image anti-aliasing device shown in the present invention can convert an aliasing image to an anti-aliasing image, and the image smoothness in the anti-aliasing image has better effect. In addition, the image anti-aliasing method and the image anti-aliasing device shown in the present invention can also perform a filter generating procedure on the aliasing image.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is a way of carrying out the invention. This description is made for the purpose of illustrating the general principles of the invention and should not be taken in a limiting sense. The scope of the invention is determined by reference to the appended claims.

The present invention is described with respect to particular embodiments and with reference to certain drawings, but the invention is not limited thereto and is only limited by the claims. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

The ordinal terms such as "first", "second", "third", etc., used in the claims to modify a claim element do not connote any priority, precedence, or order of one claim element over another or the temporal order in which acts of a method are performed, but are used merely as labels to distinguish one claim element having a certain name from another element having the same name.

Figure 1:
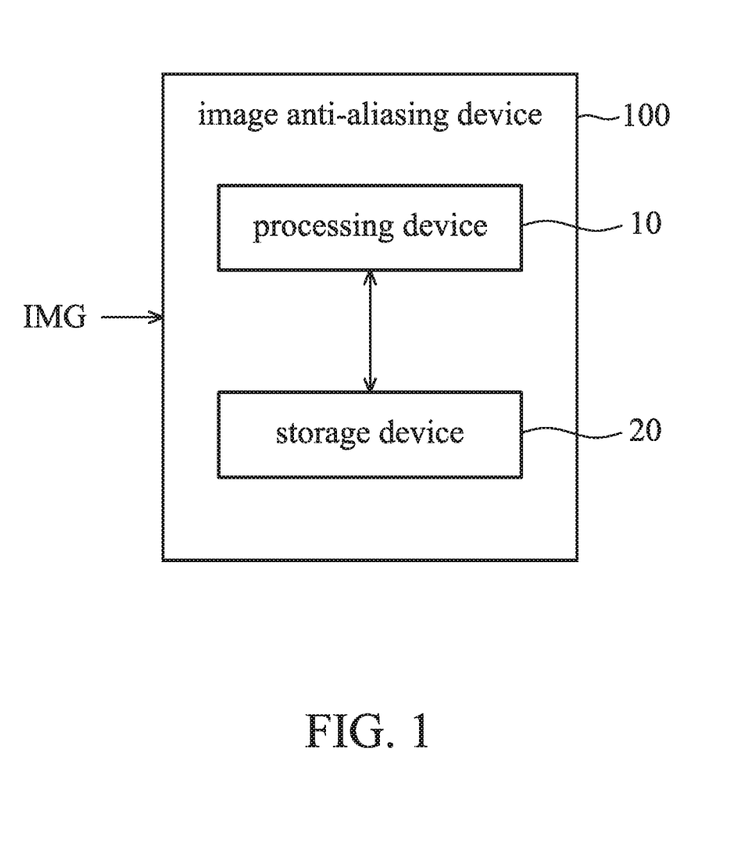
FIG. 1 is a block diagram of an image anti-aliasing device in accordance with one embodiment of the present disclosure.

Please refer to FIG. 1. FIG. 1 is a block diagram of an image anti-aliasing device 100 in accordance with one embodiment of the present disclosure. The image anti-aliasing device 100 includes a processing device 10 and a storage device 20. The processing device 10 is coupled to the storage device 20. In one embodiment, the image anti-aliasing device 100 can be implemented in a computer, a tablet, a mobile phone, or other electronic device with calculating function. The processing device 10 can be implemented by using an integrated circuit, such as a microcontroller, a microprocessor, a digital signal processor, an application specific integrated circuit (ASIC), or a logic circuit. The storage device 20 can be implemented as a read-only memory, a flash memory, a floppy disk, a hard disk, a compact disk, a flash drive, a tape, a network accessible database, or as a storage medium that can be easily considered by those skilled in the art to have the same function.

In one embodiment, the processing device 10 of the image anti-aliasing device 100 receives an aliasing image IMG. The processing device 10 performs anti-aliasing processing procedure on the aliasing image IMG to generate an anti-aliasing image. Specifically, after the aliasing image IMG is received, the processing device 10 generates a plurality of hash values corresponding to the plurality of source pixels in the aliasing image IMG. The processing device 10 further filters the aliasing image IMG based on the generated plurality of hash values and the pre-training filter group stored in the storage device 20 to generate an anti-aliasing image. In another embodiment, the processing device 10 also stores the generated plurality of hash values and/or the anti-aliasing images generated after the filtering processing procedure is performed in the storage device 20. The processing device 10 sends the generated anti-aliasing image to a display device (not shown) for display. Then, the processing device 10 deletes the plurality of hash values and anti-aliasing images temporarily stored in the storage device 20.

In one embodiment, the image anti-aliasing device 100 is a functional module of a graphic processing unit (GPU). Before the graphic processing unit outputs the image to the display device, it outputs the image to the image anti-aliasing device 100 for anti-aliasing processing. Then, the graphic processing unit outputs the generated anti-aliasing image to the display device to obtain the better image display effect. In another embodiment, the image anti-aliasing device 100 is coupled between a central processing unit (CPU) and a display device. The image to be displayed by the central processing unit is firstly output to the image anti-aliasing device 100 for anti-aliasing processing, and then the generated anti-aliasing image is outputted to the display device to obtain the better image display effect.

In another embodiment, the image anti-aliasing device 100 of FIG. 1 can also be used to perform a filter generating procedure on the aliasing image IMG, that is, to generate the pre-training filter group used in the first embodiment of FIG. 1 by offline training. Specifically, the processing device 10 receives the aliasing image IMG, and the processing device 10 generates a plurality of hash values corresponding to the plurality of source pixels in the aliasing image IMG. The processing device 10 performs an anti-aliasing processing procedure on the aliasing image IMG using a conventional anti-aliasing processing method, for example, using Fast Approximate Anti-Aliasing (FXAA) to generate the anti-aliasing image. In one embodiment, processing device 10 also stores the generated plurality of hash values and/or anti-aliasing images generated using conventional anti-aliasing processing methods in storage device 20. The processing device 10 obtains an optimal filter for each of the plurality of hash values according to the plurality of hash values and the anti-aliasing image generated by the processing device 10. The processing device 10 stores the optimal filter and corresponding hash value in the storage device 20.

Figure 2:
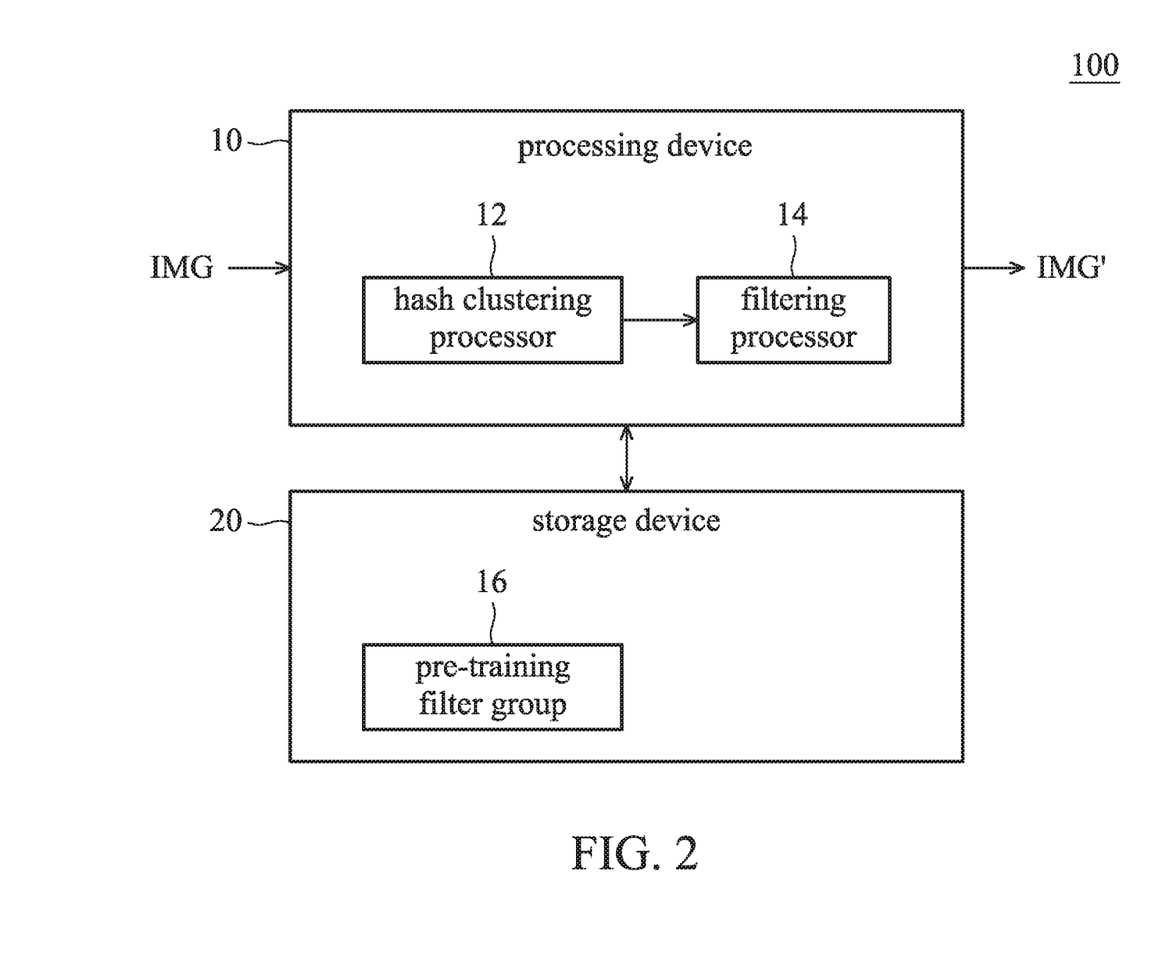
FIG. 2 is a block diagram of a more detailed image anti-aliasing device in accordance with one embodiment of the present disclosure.

Refer to FIG. 2, FIG. 2 is a block diagram of a more detailed image anti-aliasing device 100 in accordance with one embodiment of the present disclosure. According to FIG. 2, the pre-training filter group 16 is included in the storage device 20. The processing device 10 includes a hash clustering processor 12 and a filtering processor 14. Furthermore, the hash clustering processor 12 is coupled to the filtering processor 14. The hash clustering processor 12 and the filtering processor 14 may be implemented by software or hardware, such as by code or by integrated circuits such as a micro control unit, a microprocessor, a digital signal processor, a special application integrated circuit or a logic circuits are implemented. After the processing device 10 receives the aliasing image IMG, the hash clustering processor 12 generates a plurality of hash values corresponding to the plurality of source pixels in the aliasing image IMG. Then, the filtering processor 14 performs anti-aliasing processing procedure on the aliasing image IMG based on the generated plurality of hash values and filters in the pre-training filter group 16, to generate an anti-aliasing image IMG'.

In one embodiment, the pre-training filter group 16 includes a plurality of different filters trained in advance. Each filter in the pre-training filter group 16 corresponds to a hash value. Filtering processor 14 may look up the corresponding filter from pre-trained filter group 16 based on the hash value. Then, the aliasing image IMG is processed by filtering processing using the corresponding filter and then an anti-aliasing image IMG' is generated. In the pre-training filter group 16, each hash value is unique. The filter group included in the pre-training filter group 16 can be generated by performing a filter generating procedure (the filter generating procedure is described in detail below in conjunction with FIG. 6). After the pre-training filter group 16 is generated, the processing device 10 can use the pre-training filter group 16 to perform the anti-aliasing processing procedure on the aliasing image IMG.

Figure 3:
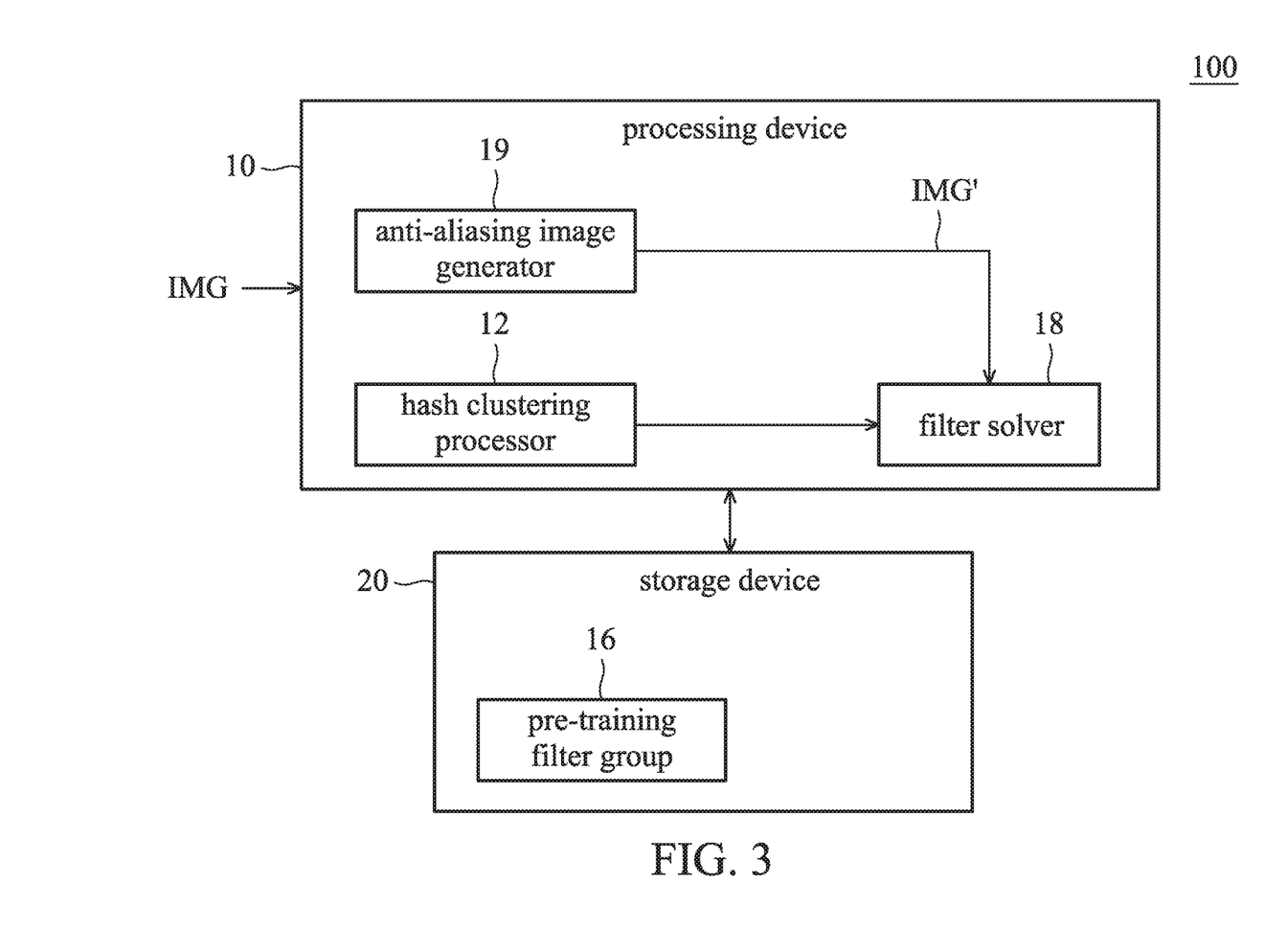
FIG. 3 is a more detailed block diagram of an image anti-aliasing device for performing filter generating procedure in accordance with one embodiment of the present disclosure.

Refer to FIG. 3, FIG. 3 is a more detailed block diagram of an image anti-aliasing device 100 for performing filter generating procedure in accordance with one embodiment of the present disclosure. The processing device 10 includes a hash clustering processor 12, an anti-aliasing image generator 19, and a filter solver 18. The filter solver 18 is coupled to the hash clustering processor 12 and the anti-aliasing image generator 19. The storage device 20 includes a pre-training filter group 16. The hash clustering processor 12, the anti-aliasing image generator 19, and the filter solver 18 can be implemented by software or hardware, for example, by code or by integrated circuits such as a micro control unit, a microprocessor, and a digital signal. Implemented by a special application integrated circuit or a logic circuit.

When performing filter generating procedure, the processing device 10 receives the aliasing image IMG, and the hash cluster processor 12 generates a plurality of hash values corresponding to the plurality of source pixels in the aliasing image IMG. The anti-aliasing image generator 19 performs an anti-aliasing process on the aliased image IMG using a conventional anti-aliasing processing method, for example, using Fast Approximate Anti-Aliasing (FXAA) to generate an anti-aliasing image IMG'. Finally, the filter solver 18 obtains an optimal filter for each of the plurality of hash values respectively based on the plurality of hash values generated by the hash cluster processor 12 and the anti-aliasing image IMG' generated by the anti-aliasing image generator 19 in order to minimize the difference between the filtered image and the anti-aliasing image IMG'. An optimal filter is obtained for each of the plurality of hash values, and the obtained optimal filter and the corresponding hash value are stored in the pre-training filter group 16. The filter solver 18 uses a least square method to generate a plurality of filters respectively for the plurality of source pixels of the aliasing image IMG according to the aliasing image IMG, the anti-aliasing image IMG', and a plurality of hash values corresponding to a plurality of source pixels (the filter generating procedure is described below in more detail, in conjunction with FIG. 6).

Figure 4:
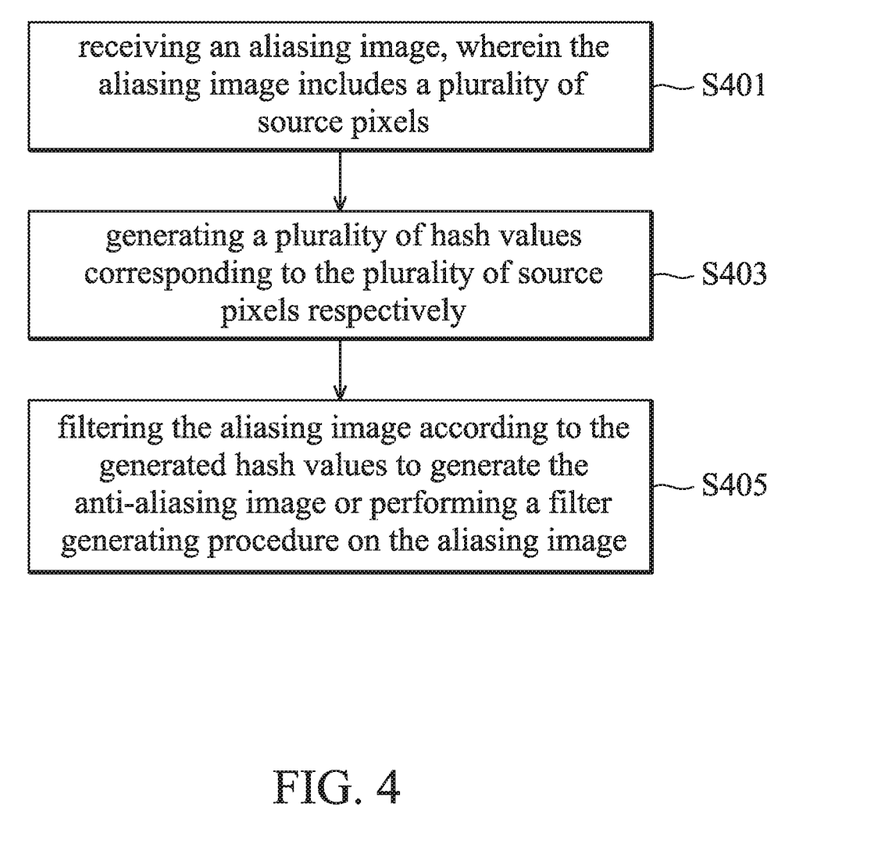
FIG. 4 is a flowchart of an image anti-aliasing method in accordance with one embodiment of the present disclosure.

Referring to FIG. 4, FIG. 4 is a flowchart of an image anti-aliasing method in accordance with one an embodiment of the present disclosure. The processing flow as shown in FIG. 4 can perform anti-aliasing processing procedure on the aliasing image IMG to generate the anti-aliasing image IMG' or perform filter generating procedure on the aliasing image IMG. The image anti-aliasing method as shown in FIG. 4 includes: step S401, receiving an aliasing image IMG. The aliasing image IMG includes a plurality of source pixels. Next, step S403 is performed to generate a plurality of hash values corresponding to the plurality of source pixels respectively. Next, step S405 is performed to filter the aliasing image IMG according to the generated hash values to generate the anti-aliasing image IMG' or to perform a filter generating procedure on the aliasing image IMG. Each of the plurality of hash values is generated by the following steps: selecting a source pixel whose hash value has not been calculated from the aliasing image IMG, and selecting a window containing the selected source pixel; determining an aliasing strength according to the grayscale values of all the source pixels of the row and column at which the selected source pixel is located in the window; and determining a hash value of the selected source pixel according to the aliasing strength. The image anti-aliasing method of FIG. 4 is applicable to online anti-aliasing processing to generate anti-aliasing image IMG' and offline generation of pre-training filter group (such as pre-training filter group 16 of FIG. 2). Subsequent details will be detailed in FIGS. 5 and 6 respectively.

Figure 5:
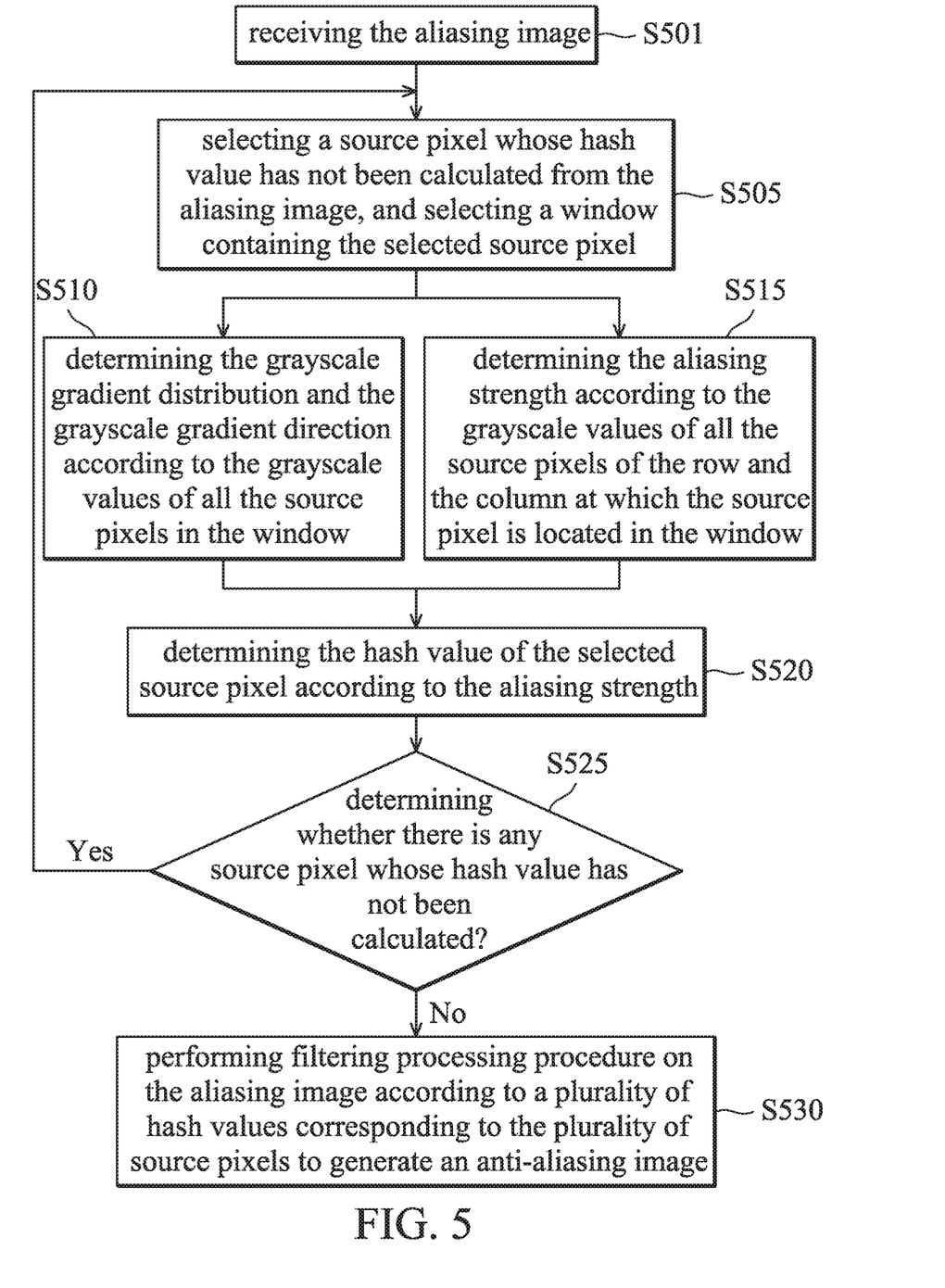
FIG. 5 is flowchart of an online anti-aliasing processing according to an embodiment of the present disclosure.
Figure 9:
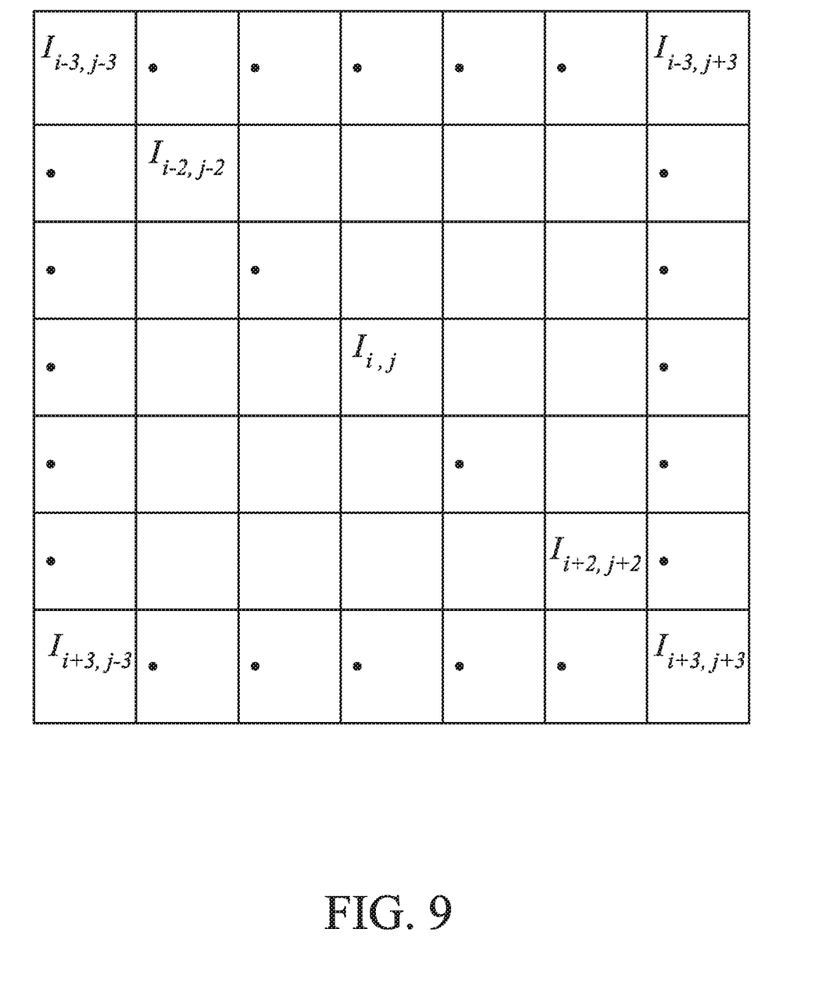
FIG. 9 is a schematic diagram of a 7×7 window centered on a source pixel $I_{i,j}$ in an aliasing image in accordance with one embodiment of the present disclosure.

Please refer to FIG. 5 and FIG. 9 together. FIG. 5 is a flowchart of an online anti-aliasing processing in accordance with one embodiment of the present disclosure. FIG. 9 is a schematic diagram of a 7×7 window centered on a source pixel $I_{i,j}$ in an aliasing image in accordance with one embodiment of the present disclosure. The flowchart shown in FIG. 5 is a processing flowchart of the image anti-aliasing device 100 for generating an anti-aliasing image shown in FIG. 2. In step S501, the processing device 10 receives the aliasing image IMG. In one embodiment, the processing device 10 stores the received aliasing image IMG in the storage device 20. Steps S505 to S520 describe a process of calculating a hash value of one source pixel in the aliasing image IMG. With reference to FIG. 9, the process of calculating the hash value of the source pixel $I_{i,j}$ in the aliasing image IMG is taken as an example is described below.

In step S505, the hash clustering processor 12 selects a source pixel $I_{i,j}$ whose hash value has not been calculated from the aliasing image IMG, and selects a window containing the selected source pixel $I_{i,j}$. As shown in FIG. 9, the hash clustering processor 12 selects a 7×7 window containing the selected source pixels $I_{i,j}$. However, the present invention is not limited thereto. The hash clustering processor 12 can also select other sizes of windows, such as 9×9 or 5×5 windows, etc.

Then, the hash clustering processor 12 performs step S515 and step S510. In step S510, the hash clustering processor 12 determines the grayscale gradient distribution and the grayscale gradient direction according to the grayscale values of all the source pixels in the window (described later with FIG. 7). In step S515, the hash clustering processor 12 determines the aliasing strength according to the grayscale values of all the source pixels of the row and the column at which the selected source pixel $I_{i,j}$ is located in the window (described in detail later with FIG. 8). It should be noted that the sequence of steps S515 and S510 is not limited in the present invention. For example, step S515 and step S510 may be performed at the same time, or step S515 may be performed before step S510, or step S510 may be performed before step S515. Then, the hash clustering processor 12 performs step S520.

In step S520, the hash clustering processor 12 determines the hash value of the selected source pixel $I_{i,j}$ according to the aliasing strength. In one embodiment, the hash clustering processor 12 calculates the hash value of the selected source pixel $I_{i,j}$ based on the grayscale gradient distribution and the grayscale gradient direction determined in the foregoing step S515. Specifically, the hash clustering processor 12 calculates the aliasing strength, the grayscale gradient distribution, and the grayscale gradient direction of the selected source pixel $I_{i,j}$ in the aliasing image IMG. Then, the hash value $H_{i,j}$ of the selected source pixel $I_{i,j}$ is calculated according to the aliasing strength, the grayscale gradient distribution, and the grayscale gradient direction. The calculation formula of the hash value $H_{i,j}$ of the selected source pixel $I_{i,j}$ is as follows:

$$H_{i,j} = (\theta_q - 1) \times \text{Num}_\mu \times \text{Num}_{strength} + (\mu_q - 1) \times \text{Num}_{strength} + \text{strength}_q$$

$H_{i,j}$ represents the hash value corresponding to the selected source pixel located at the i-th row and the j-th column in the aliasing image, $\theta_q$ represents the grayscale gradient direction of the selected source pixel located at the i-th row and the j-th column in the aliasing image, $\mu_q$ is the grayscale gradient distribution of the selected source pixels located at the i-th row and the j-th column in the aliasing image, $\text{strength}_q$ represents the aliasing strength of the selected source pixel located at the i-th row and the j-th column in the aliasing image, $\text{Num}_\mu$ represents the total number of categories after the grayscale gradient distribution is quantized, and $\text{Num}_{strength}$ represents the total number of categories after the aliasing strength is quantized.

The grayscale gradient direction, the grayscale gradient distribution and the aliasing strength of the selected source pixel $I_{i,j}$ in the aliasing image IMG can well reflect the texture information around the selected source pixel $I_{i,j}$. The grayscale gradient direction reflects the direction of the aliasing. The aliasing strength reflects the degree of the aliasing. The grayscale gradient distribution reflects the structure of the aliasing. The low aliasing strength with a low grayscale gradient distribution, indicating that the selected source pixel $I_{i,j}$ is in a texture region of a multi-directional structure or a flat region (no image texture information), and the degree of aliasing is low. The low aliasing strength with a high grayscale gradient distribution, indicating that the selected source pixel $I_{i,j}$ is in a texture region of a unidirectional structure, and the degree of aliasing is low. The high aliasing strength with a low grayscale gradient distribution, indicating that the selected source pixel $I_{i,j}$ is in a texture region of a multi-directional structure, and the degree of aliasing is high. The high aliasing strength with a high grayscale gradient distribution, indicating that the selected source pixel $I_{i,j}$ is in a texture region of a unidirectional structure, and the degree of aliasing is high.

After the hash value $H_{i,j}$ of the selected source pixel $I_{i,j}$ in the aliasing image IMG is calculated, the hash clustering processor 12 performs step S525. In step S525, the hash clustering processor 12 determines whether there is any source pixel whose hash value has not been calculated. Specifically, the hash clustering processor 12 determines whether there is a source pixel in the aliasing image IMG whose hash value have not yet been calculated. If so, the hash clustering processor 12 performs step S505. If not, the filtering processor 14 performs step S530.

In step S530, the filtering processor 14 performs filtering processing procedure on the aliasing image IMG according to a plurality of hash values corresponding to the plurality of source pixels to generate an anti-aliasing image IMG'. Specifically, the filtering processor 14 performs filtering processing procedure on the plurality of source pixels according to the plurality of hash values corresponding to the plurality of source pixels and the pre-training filter group 16. Then an anti-aliasing image IMG' can be generated. The detailed process of filtering the selected source pixels $I_{i,j}$ is as follows:

Firstly, the filtering processor 14 obtains a hash value h corresponding to the selected source pixel $I_{i,j}$ in the aliasing image IMG from a plurality of hash values. Filtering processor 14 then looks up the corresponding filter from pre-training filter group 16 according to the hash value h. Finally, the filtering processor 14 performs a convolution operation using the filter and the selected source pixel $I_{i,j}$ in the aliasing image IMG. The value obtained by performing the convolution operation is the pixel value of the target pixel, corresponding to the selected source pixel $I_{i,j}$ in the aliasing image IMG, in the anti-aliasing image IMG'.

Figure 6:
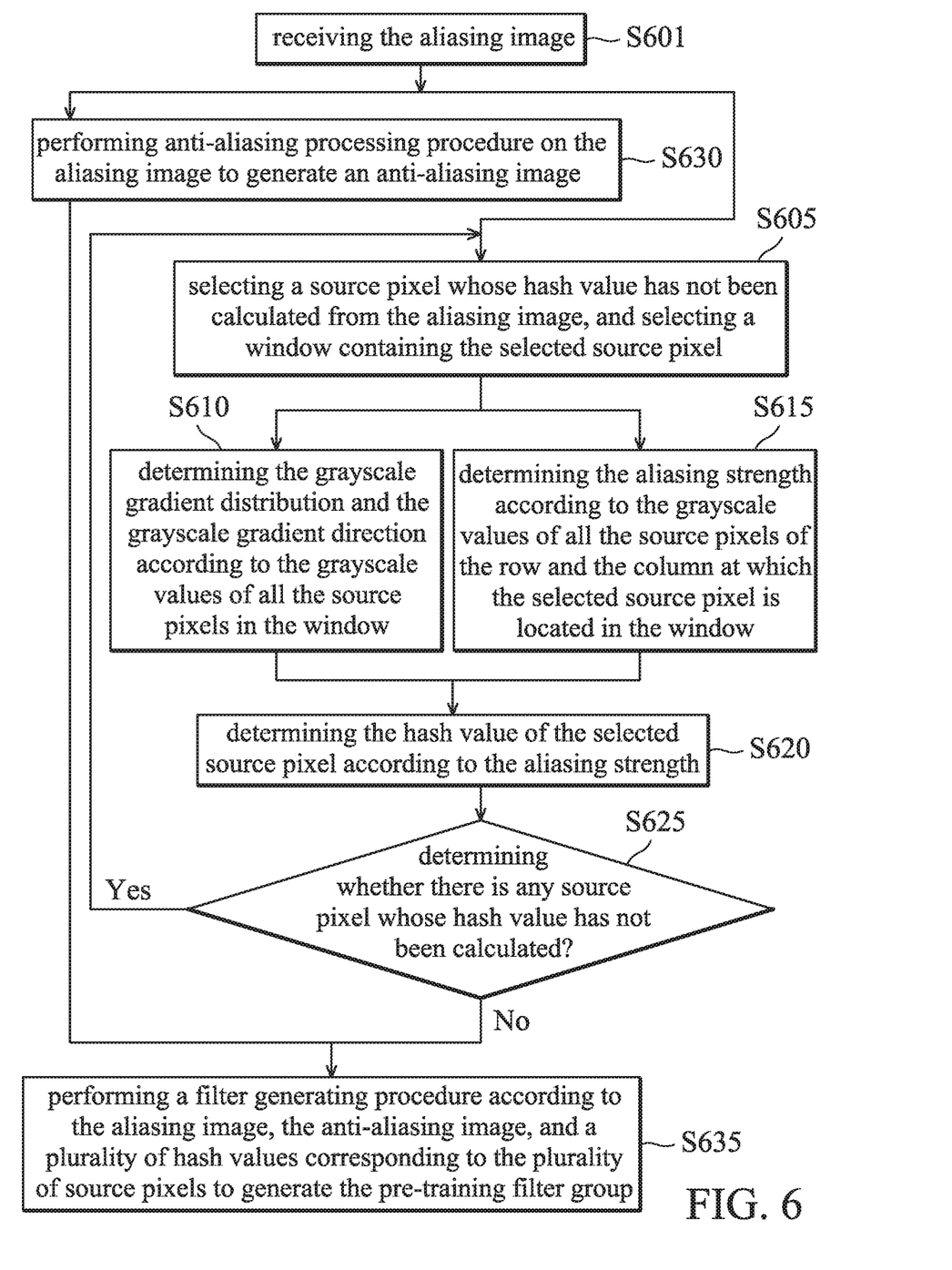
FIG. 6 is a flowchart of the offline generation of a pre-training filter group in accordance with one embodiment of the present disclosure.

FIG. 6 is a flowchart of the offline generation of a pre-training filter group in accordance with one embodiment of the present disclosure. The flowchart shown in FIG. 6 is a processing flowchart of the image anti-aliasing device 100 for performing filter generating procedure shown in FIG. 3. In order to achieve a good training effect, the image anti-aliasing device 100 for performing the filter generating procedure needs to use enough (for example, 100,000 sheets) aliasing images IMG for training to generate a better pre-training filter group 16. The flow of training one aliasing image IMG is described below.

Steps S601, S605, S610, S615, S620, and S625 in FIG. 6 are the same as steps S501, S505, S510, S515, S520, and S525 in FIG. 5, and are not described herein again. Steps S630 and S635 are described below.

In step S630, the anti-aliasing image generator 19 performs anti-aliasing processing procedure on the aliasing image IMG to generate an anti-aliasing image IMG'. Specifically, the anti-aliasing image generator 19 uses a conventional anti-aliasing processing method, for example, using the Fast Approximate Anti-Aliasing (FXAA) method, to perform anti-aliasing processing procedure on the aliasing image IMG to generate an anti-aliased image IMG'. Then, the filter solver 18 performs step S635.

In step S635, the filter solver 18 performs a filter generating procedure according to the aliasing image IMG, the anti-aliasing image IMG', and a plurality of hash values corresponding to the plurality of source pixels to generate the pre-training filter group 16. Specifically, the filter solver 18 uses a least square method to generate a plurality of filters respectively for the source pixels of the aliasing image IMG according to the aliasing image IMG, the anti-aliasing image IMG', and a plurality of hash values corresponding to a plurality of source pixels. Each of the hash values corresponds to a filter. The set of the plurality of hash values for all source pixels in the aliasing image IMG and their respective corresponding filters is the pre-training filter group 16.

Figure 7:
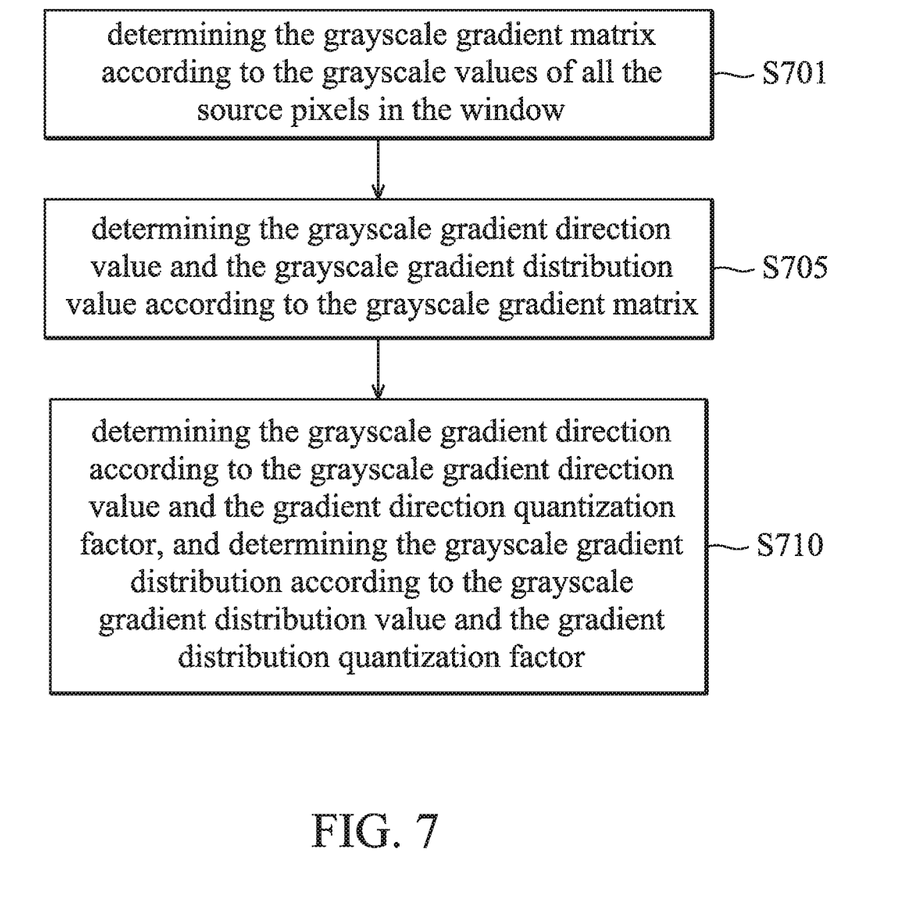
FIG. 7 is a flowchart of the determination of the grayscale gradient direction and the grayscale gradient distribution in accordance with one embodiment of the present disclosure.

FIG. 7 is a flowchart of the determination of the grayscale gradient direction and the grayscale gradient distribution in accordance with one embodiment of the present disclosure. The processing flow shown in FIG. 7 generates a grayscale gradient direction and a grayscale gradient distribution of the selected source pixels $I_{i,j}$ in the aliasing image IMG as shown in FIG. 9. The processing flow of FIG. 7 is described in detail below.

In step S701, the hash clustering processor 12 determines the grayscale gradient matrix according to the grayscale values of all the source pixels in the window as shown in FIG. 9. Specifically, the hash clustering processor 12 determines the grayscale gradient matrix according to the grayscale values of all the source pixels in the 7×7 window as shown in FIG. 9. In order to calculate the hash value $H_{i,j}$ of the selected source pixel $I_{i,j}$ in the aliasing image IMG, the hash clustering processor 12 needs to firstly calculate all the grayscale gradient values of all the source pixels in the 5×5 window centered on the selected source pixel $I_{i,j}$ in the aliasing image IMG. The grayscale gradient value of each source pixel includes a horizontal grayscale gradient value Gx and a vertical grayscale gradient value Gy. As shown in FIG. 9, the hash clustering processor 12 needs to calculate the grayscale gradient values of a total of 25 source pixels that from the source pixels $I_{i-2,j-2}$ to the source pixels $I_{i+2,j+2}$. Taking the selected source pixel $I_{i,j}$ as an example, when calculating the grayscale value of the selected source pixel $I_{i,j}$, firstly the 3×3 window centered on the selected source pixel $I_{i,j}$ is taken. And then, the horizontal grayscale gradient value and the vertical grayscale gradient value of the selected source pixel $I_{i,j}$ can be calculated by the following formula:

$$Gx_{i,j} = \Sigma_{y=-1}^{1} \Sigma_{x=-1}^{1} I_{i+x,j+y} \times Soble X_{x+2,y+2} \qquad (1)$$

$$Gy_{i,j} = \Sigma_{y=-1}^{1} \Sigma_{x=-1}^{1} I_{i+x,j+y} \times Soble X_{x+2,y+2} \qquad (2)$$

$Gx_{i,j}$ represents the horizontal grayscale gradient value of the selected source pixel $I_{i,j}$. $Gy_{i,j}$ represents the vertical grayscale gradient value of the source pixel $I_{i,j}$.

$$SobelX = \begin{bmatrix} -1 & 0 & 1 \\ -2 & 0 & 2 \\ -1 & 0 & 1 \end{bmatrix}, SobelY = \begin{bmatrix} -1 & -2 & -1 \\ 0 & 0 & 0 \\ 1 & 2 & 1 \end{bmatrix},$$

$I_{i+x,j+y}$ represents the grayscale value of the selected source pixel $I_{i+x,j+y}$. Σ represents the summation notation.

The grayscale gradient matrix G is composed of the grayscale gradient values of all the source pixels in the 5×5 window centered on the source pixel $I_{i,j}$:

$$G = \begin{bmatrix} GX_{i-2,j-2} & GY_{i-2,j-2} \\ GX_{i-2,j-1} & GY_{i-2,j-1} \\ \vdots & \vdots \\ GX_{i+2,j+1} & GY_{i+2,j+1} \\ GX_{i+2,j+2} & GY_{i+2,j+2} \end{bmatrix}_{25 \times 2}$$

Then, in step S705, the hash clustering processor 12 determines the grayscale gradient direction value and the grayscale gradient distribution value according to the grayscale gradient matrix G. Specifically, firstly the hash clustering processor 12 generates a covariance matrix M according to the grayscale gradient matrix G. The hash clustering processor 12 generates a covariance matrix M using the following formula:

$$M = G^T W G = \begin{bmatrix} A & B \\ B & C \end{bmatrix}_{2 \times 2}$$

Where $G^T$ is the transposition of the grayscale gradient matrix G. $G^T WG$ indicates that the matrices $G^T$, W and G are multiplied. A represents the value of the first row and the first column in the generated covariance matrix M. B represents the values of the first row, the second column, and the second row, the first column in the generated covariance matrix M. C represents the value of the second row and the second column in the generated covariance matrix M, wherein W is the weight matrix of 25 rows and 25 columns, W is:

$$W = \begin{bmatrix} W_1 & & & \\ & W_2 & & \\ & & \ldots & \\ & & & W_{25} \end{bmatrix}_{25 \times 25}$$

W1-W25 are weight values. Furthermore, a position in the matrix W where no value is written corresponds to a weight value of 0. In one embodiment, the values of W1-W25 are all 1.

Then, the hash clustering processor 12 generates a grayscale gradient direction value and a grayscale gradient distribution value for the covariance matrix M. Specifically, after the covariance matrix M is generated, the hash clustering processor 12 performs eigenvalue decomposition on the covariance matrix M, and calculates the maximum eigenvalue $\lambda_1$ and the minimum eigenvalue $\lambda_2$ of the covariance matrix M. Furthermore, the eigenvector $\varphi_1$ corresponding to the maximum eigenvalue $\lambda_1$ of the covariance matrix M is calculated. The eigenvector $\varphi_1$ is a matrix $$\varphi_1 = \begin{bmatrix} \varnothing_{1,y} \\ \varnothing_{1,x} \end{bmatrix},$$

wherein $\varnothing_{1,y}$ represents the vector value perpendicular to the grayscale gradient direction, and $\varnothing_{1,x}$ represents the vector value in the grayscale gradient direction. The hash clustering processor 12 calculates the grayscale gradient direction value according to the eigenvector $\varphi_1$, and the calculation formula of the grayscale gradient direction value is as follows. $\theta = \arctan(\varnothing_{1,y}, \varnothing_{1,x})$ wherein θ represents the grayscale gradient direction value of the source pixel $I_{i,j}$. Furthermore, arctan( ) represents the arctangent function. The hash clustering processor 12 calculates the grayscale gradient distribution value according to the maximum eigenvalue $\lambda_1$ and the minimum eigenvalue $\lambda_2$. Furthermore, the calculation formula of the grayscale gradient distribution value is as follows:

$$\mu = \frac{\sqrt{\lambda_1} - \sqrt{\lambda_2}}{\sqrt{\lambda_1} + \sqrt{\lambda_2}},$$

wherein μ denotes the grayscale gradient distribution value of the selected source pixel $I_{i,j}$.

After the grayscale gradient direction value θ and the grayscale gradient distribution value are generated, the hash clustering processor 12 performs step S710. In step S710, the hash clustering processor 12 determines the grayscale gradient direction according to the grayscale gradient direction value θ and the gradient direction quantization factor, and determines the grayscale gradient distribution according to the grayscale gradient distribution value μ and the gradient distribution quantization factor. Specifically, in order to reduce the number of grayscale gradient directions and grayscale gradient distribution, the hash clustering processor 12 quantizes the grayscale gradient direction value θ using the gradient direction quantization factor $Q_\theta$, and quantizes the grayscale gradient distribution value μ using the gradient distribution quantization factor $Q_\mu$. The gradient direction quantization factor $Q_\theta$ and the gradient distribution quantization factor $Q_\mu$ are preset values. In one embodiment, the gradient direction quantization factor $Q_\theta$ is 24 and the gradient distribution quantization factor $Q_\mu$ is 3. The quantization formula of the gray gradient direction value θ is as follows:

$$\theta_q = \left\lceil \frac{\theta}{Q_\theta} \right\rceil,$$

$\theta_q$ is the grayscale gradient direction. $Q_\theta$ is the gradient direction quantization factor. ⌈ ⌉ represents a ceiling calculation. The quantization formula of the grayscale gradient distribution value is as follows:

$$\mu_q = \left\lceil \frac{\mu}{Q_\mu} \right\rceil$$

$\mu_q$ is the grayscale gradient distribution. $Q_\mu$ is the gradient distribution quantization factor. ⌈ ⌉ represents a ceiling calculation.

Figure 8:
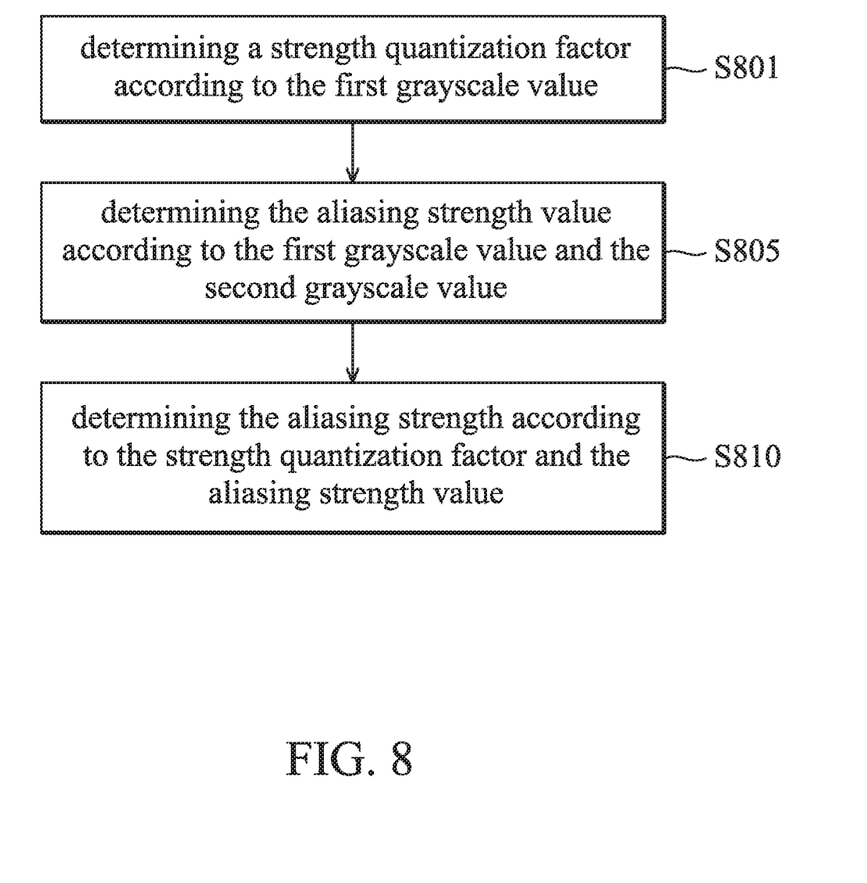
FIG. 8 is a flowchart diagram of the determination of the aliasing strength in accordance with one embodiment of the present disclosure.

FIG. 8 is a flowchart diagram of the determination of the aliasing strength in accordance with one embodiment of the present disclosure. The processing flow shown in FIG. 8 generates the aliasing strength of the selected source pixels $I_{i,j}$ in the aliasing image IMG as shown in FIG. 9. For the convenience of the following description, the grayscale value of the source pixel having the largest grayscale value among all the source pixels of the row and column at which the source pixel $I_{i,j}$ is located in the 7×7 window is defined as the first grayscale value. The grayscale value of the source pixel having the smallest grayscale value among all the source pixels of the row and column at which the source pixel $I_{i,j}$ is located is defined as the second grayscale value. The processing flow shown in FIG. 8 is described in detail below.

In step S801, the hash clustering processor 12 determines the strength quantization factor according to the first grayscale value. Specifically, as shown in FIG. 9, the hash clustering processor 12 firstly acquires grayscale values of two source pixels, which have the largest grayscale value and the smallest grayscale value respectively, of all the source pixels of the row and the column at which the source pixel $I_{i,j}$ is located in the 7×7 window centered on the source pixel $I_{i,j}$, and the largest grayscale value and the smallest grayscale value are recorded as the first grayscale value maxLuma and the second grayscale value minLuma respectively. The source pixels of the row at which the source pixel $I_{i,j}$ is located include $I_{i-3,j}$, $I_{i-2,j}$, $I_{i-1,j}$, $I_{i,j}$, $I_{i+1,j}$, $I_{i+2,j}$ and $I_{i+3,j}$. The source pixels of the column at which the source pixel $I_{i,j}$ is located include $I_{i,j-3}$, $I_{i,j-2}$, $I_{i,j-1}$, $I_{i,j}$, $I_{i,j+1}$, $I_{i,j+2}$, and $I_{i,j+3}$.

Then, the hash clustering processor 12 calculates the strength quantization factor according to the first grayscale value maxLuma. In one embodiment, the formula for calculating the strength quantization factor is as follows:

$$Q_s = \text{alpha} \times \text{maxLuma}$$

$Q_s$ is the strength quantization factor, maxLuma is the first grayscale value, and alpha is a preset value. In one embodiment, the value of alpha is 0.3.

After the strength quantization factor is calculated, the hash clustering processor 12 proceeds to step S805. In step S805, the hash clustering processor 12 determines the aliasing strength value according to the first grayscale value and the second grayscale value. Specifically, the hash clustering processor 12 determines the aliasing strength value according to the difference between the first grayscale value maxLuma and the second grayscale value minLuma. The larger the difference between the first grayscale value maxLuma and the second grayscale value minLuma is, the larger the aliasing strength is. In one embodiment, the calculation formula of the aliasing strength value is as follows:

$$\text{strength} = \text{maxLuma} - \text{minLuma}$$

The strength is the aliasing strength value.

After the aliasing strength value is calculated, the hash clustering processor 12 proceeds to step S810. In step S810, the hash clustering processor 12 determines the aliasing strength according to the strength quantization factor $Q_s$ and the aliasing strength value (noted by 'strength' in the formula). Specifically, the hash clustering processor 12 quantizes the aliasing strength value (noted by 'strength' in the formula) by using the strength quantization factor $Q_s$ to obtain the aliasing strength. The larger the aliasing strength value (noted by 'strength' in the formula) is, the larger the aliasing strength is. The larger the strength quantization factor $Q_s$ is, the smaller the aliasing strength is. In one embodiment, the formula for calculating the aliasing strength is as follows:

$$\text{strength}_q = \lceil \text{strength}/Q_s \rceil$$

The $\text{strength}_q$ is the aliasing strength, strength is the aliasing strength value, $Q_s$ is the strength quantization factor. Furthermore, $\lceil\ \rceil$ represents a ceiling calculation.

In one embodiment, when $\text{strength}_q$ is greater than maxStrengthQ, $\text{strength}_q$ takes a value of maxStrengthQ. The maxStrengthQ is a preset value. In another embodiment, the value of maxStrengthQ is 3.

In summary, the image anti-aliasing method and the image anti-aliasing device shown in the present invention can convert an aliasing image to an anti-aliasing image, and the image smoothness in the anti-aliasing image has better effect. In addition, the image anti-aliasing method and the image anti-aliasing device shown in the present invention can also perform a filter generating procedure on the aliasing image.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An image anti-aliasing method, comprising:
   receiving an aliasing image, wherein the aliasing image includes a plurality of source pixels;
   generating a plurality of hash values corresponding to the plurality of source pixels respectively; and
   performing a filtering processing or a filter generating procedure on the aliasing image according to the plurality of hash values;
   wherein each of the plurality of hash values is generated by the following steps:
   selecting one source pixel from the aliasing image and selecting a window containing the selected source pixel;
   determining an aliasing strength according to grayscale values of all the source pixels of a row and a column at which the selected source pixel is located in the window; and
   determining a hash value of the selected source pixel according to the aliasing strength.

2. The image anti-aliasing method of claim 1, wherein the step of determining the aliasing strength according to the grayscale values of all the source pixels of the row and the column at which the selected source pixel is located in the window comprises:
   determining a strength quantization factor according to a first grayscale value;
   wherein the first grayscale value is the largest grayscale value of the grayscale values of all the source pixels of the row and the column at which the selected source pixel is located in the window.

3. The image anti-aliasing method of claim 2, wherein the larger the first grayscale value is, the larger the strength quantization factor is.

4. The image anti-aliasing method of claim 2, wherein a formula for determining the strength quantization factor is:

$$Q_s = \text{alpha} \times \text{maxLuma}$$

wherein $Q_s$ is the strength quantization factor, maxLuma is the first grayscale value, and alpha is a preset value.

5. The image anti-aliasing method of claim 1, wherein the step of determining the aliasing strength according to the grayscale values of all the source pixels of the row and the column at which the selected source pixel is located in the window comprises:
   determining an aliasing strength value according to a first grayscale value and a second grayscale value;
   wherein the first grayscale value is the largest grayscale value of the grayscale values of all the source pixels of the row and the column at which the selected source pixel is located in the window, and the second grayscale value is the smallest grayscale value of the grayscale values of all the source pixels of the row and the column at which the selected source pixel is located in the window.

6. The image anti-aliasing method of claim 5, wherein the aliasing strength value is a difference between the first grayscale value and the second grayscale value.

7. The image anti-aliasing method of claim 1, wherein the step of determining the aliasing strength according to the grayscale values of all source pixels of the row and the column at which the selected source pixel is located in the window comprises:
   determining an aliasing quantization factor according to a first grayscale value;
   determining an aliasing strength value according to the first grayscale value and a second grayscale value; and
   determining the aliasing strength according to the aliasing quantization factor and the aliasing strength value;
   wherein the first grayscale value is the largest grayscale value of the grayscale values of all the source pixels of the row and the column at which the selected source pixel is located in the window, and the second grayscale value is the smallest grayscale value of the grayscale values of all the source pixels of the row and the column at which the selected source pixel is located in the window.

8. The image anti-aliasing method of claim 7, wherein the larger the aliasing strength value is, the larger the aliasing strength is, while the larger the strength quantization factor is, the smaller the aliasing strength is.

9. The image anti-aliasing method of claim 7, wherein a formula for determining the aliasing strength is:

$$\text{strength}_q = \lceil \text{strength}/Q_s \rceil$$

wherein $\text{strength}_q$ is the aliasing strength, strength is the aliasing strength value, $Q_s$ is the strength quantization factor, and $\lceil \ \rceil$ represents a ceiling calculation.

10. The image anti-aliasing method of claim 9, wherein when $\text{strength}_q$ is greater than maxStrengthQ, $\text{strength}_q$ takes the value maxStrengthQ; wherein $\text{strength}_q$ is the aliasing strength and maxStrengthQ is a preset value.

11. The image anti-aliasing method of claim 1, wherein the step of determining the hash value of the selected source pixel according to the aliasing strength comprises:
   determining the hash value of the selected source pixel according to the aliasing strength, a grayscale gradient direction, and a grayscale gradient distribution;
   wherein the grayscale gradient direction and the grayscale gradient distribution are determined according to a grayscale gradient matrix around the selected source pixel in the window.

12. The image anti-aliasing method of claim 1, wherein a formula for calculating the hash value of the selected source pixel is:

$$H_{i,j} = (\theta_q - 1) \times \text{Num} \times \text{Num}_{strength} + (\mu_q - 1) \times \text{Num}_{strength} + \text{strength}_q$$

wherein $H_{i,j}$ represents the hash value corresponding to the selected source pixel located at the i-th row and the j-th column in the aliasing image, and $\theta_q$ represents a grayscale gradient direction of the selected source pixel located at the i-th row and the j-th column in the aliasing image, $\mu_q$ is a grayscale gradient distribution of the selected source pixels located at the i-th row and the j-th column in the aliasing image, and $\text{strength}_q$ represents the aliasing strength of the selected source pixel located at the i-th row and the j-th column in the aliasing image, $\text{Num}_\mu$ represents the total number of categories after the grayscale gradient distribution is quantized, and $\text{Num}_{strength}$ represents the total number of categories after the aliasing strength is quantized.

13. An image anti-aliasing device, comprising:
   a storage device; and
   a processing device, coupled to the storage device, wherein the processing device receives an aliasing image, generates a plurality of hash values corresponding to a plurality of source pixels respectively, and performs a filtering processing or a filter generating procedure on the aliasing image according to the plurality of hash values, wherein the aliasing image includes the plurality of source pixels;
   wherein each of the plurality of hash values is generated by the following steps:
   selecting one source pixel from the aliasing image and selecting a window containing the selected source pixel;
   determining an aliasing strength according to grayscale values of all the source pixels of a row and a column at which the selected source pixel is located in the window; and
   determining a hash value of the selected source pixel according to the aliasing strength.

14. The image anti-aliasing device of claim 13, wherein the processing device further determines a strength quantization factor according to a first grayscale value;
   wherein the first grayscale value is the largest grayscale value of the grayscale values of all the source pixels of the row and the column at which the selected source pixel is located in the window.

15. The image anti-aliasing device of claim 14, wherein the larger the first grayscale value is, the larger the strength quantization factor is.

16. The image anti-aliasing device of claim 14, wherein the formula for determining the strength quantization factor is:

$$Q_s = \text{alpha} \times \text{maxLuma}$$

wherein $Q_s$ is the strength quantization factor, maxLuma is the first grayscale value, and alpha is a preset value.

17. The image anti-aliasing device of claim 14, wherein the processing device further determines an aliasing strength value according to the first grayscale value and a second grayscale value; wherein the second grayscale value is the smallest grayscale value of the grayscale values of all the source pixels of the row and the column at which the selected source pixel is located in the window.

18. The image anti-aliasing device of claim 17, wherein the aliasing strength value is a difference between the first grayscale value and the second grayscale value.

19. The image anti-aliasing device of claim 17, wherein the processing device further determines the aliasing strength according to the aliasing quantization factor and the aliasing strength value.

20. The image anti-aliasing device of claim 19, wherein a formula for determining the aliasing strength is:

$$strength_q = \lceil strength/Q_s \rceil$$

wherein $strength_q$ is the aliasing strength, strength is the aliasing strength value, $Q_s$ is the strength quantization factor, and $\lceil \ \rceil$ represents a ceiling calculation.

* * * * *